Dec. 18, 1951     E. C. KARSTEDT     2,578,935
HEN'S NEST
Filed Aug. 18, 1948
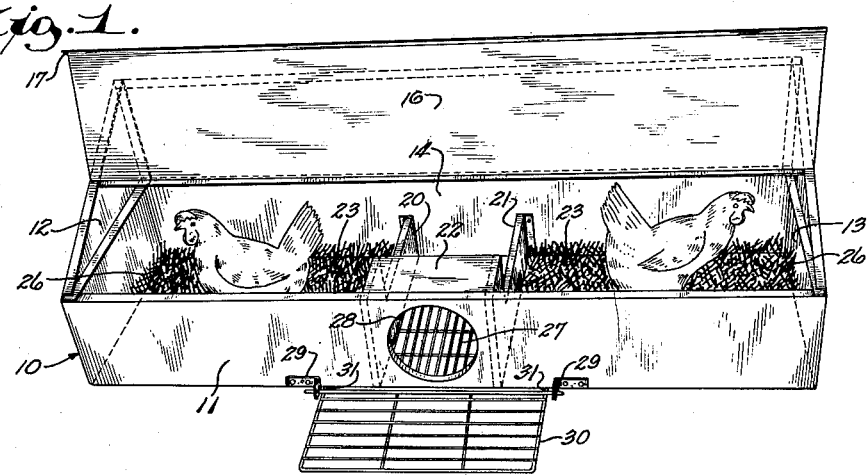
Fig. 1.
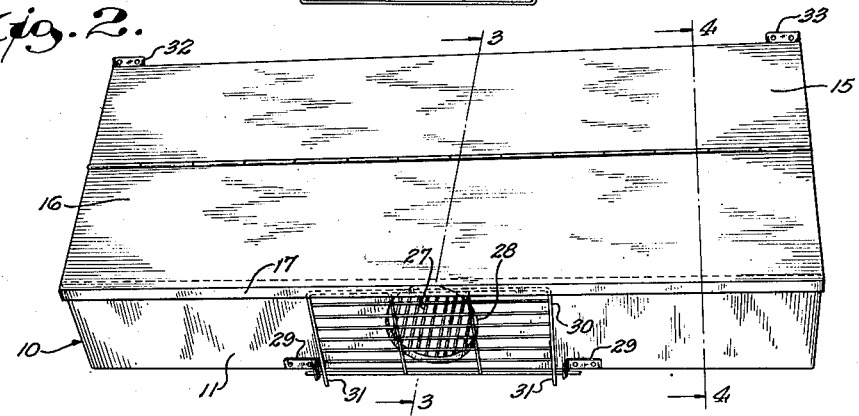
Fig. 2.
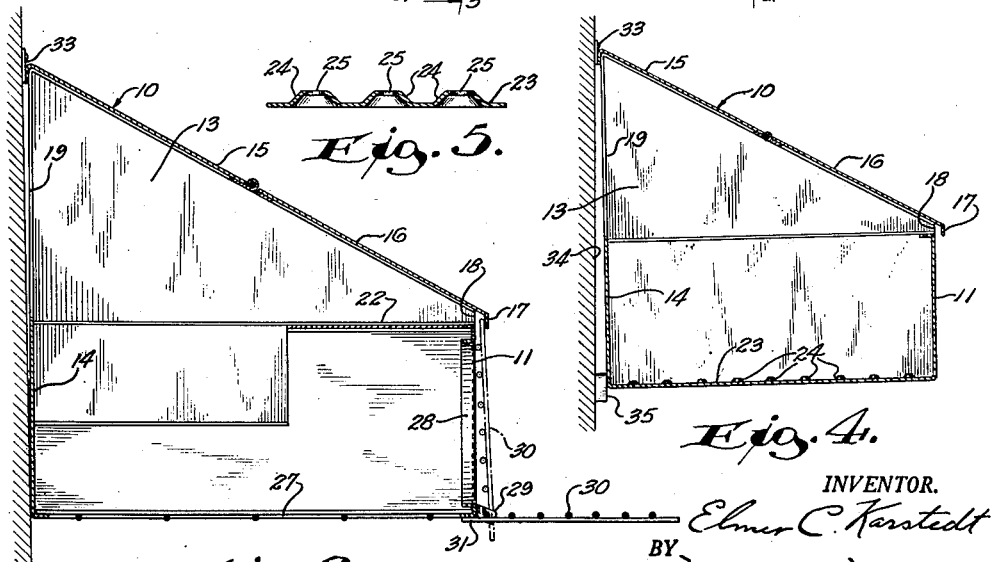
Fig. 5.
Fig. 4.
Fig. 3.
INVENTOR.
Elmer C. Karstedt
BY
Morsell & Morsell
ATTORNEYS.

Patented Dec. 18, 1951

2,578,935

UNITED STATES PATENT OFFICE 2,578,935

HEN'S NEST

Elmer C. Karstedt, Burlington, Wis.

Application August 18, 1948, Serial No. 44,879

3 Claims. (Cl. 119—45)

This invention relates to improvements in hen's nests.

When using the conventional open type of hen's nest the poultry industry loses a substantial amount of revenue which would otherwise be received if all of the eggs laid by the hens were usable and immediately fit for marketing. Two of the main reasons for this loss are the breakage of eggs in the nest, and the time and expense of cleaning eggs which have become dirty either because of contact with manure carried into the nest on the hen's feet or because of contact with the fluid of adjacent broken eggs. Washing of dirty eggs is unsatisfactory, not only because it does not always remove the stain from the egg shells, but also because washed eggs do not keep well. The alternative egg cleaning process which consists in using an abrasive is, of necessity, tedious and expensive.

Experience has shown that where conventional open type nests having room therein for only one hen at a time are used, the hens will tend to fight for possession of the single nest, and as a result eggs in the nest are broken by the scratching of the hens. It has been found, however, that when a larger, enclosed nest having a darkened interior is provided, a number of hens will nest peacefully next to one another without breaking the eggs.

It is therefore a general object of the invention to provide a well ventilated, enclosed hen's nest having a darkened interior and having a tunnel portion providing access to said interior.

A further object of the invention is to provide a hen's nest of the class described having a wire grating roost mounted exteriorly adjacent the entrance thereto, and having a wire grating floor in the tunnel portion thereof, whereby any dirt adhering to the feet of the hens will drop through said gratings and will not be carried into the nest.

A further object of the invention is to provide a hen's nest of the class described having a flanged cover and having the roost thereof hinged and swingable upwardly to a position wherein it blocks the nest entrance, said cover flange being adapted to hold the roost in said entrance blocking position, whereby hens which would otherwise try to brood may be prevented from occupying the nest during non-laying hours.

A further object of the invention is to provide a hen's nest of the class described wherein the floor of the nest proper is constructed in a manner to permit proper ventilation while at the same time preventing dropping of litter through the ventilating openings.

A more specific object of the invention is to provide a hen's nest of the class described having the floor thereof formed with upwardly projecting indentations and having ventilating openings at the apexes of said indentations.

A further specific object of the invention is to provide a hen's nest having a rear side wall which extends adjacent the wall to which the nest is attached, said rear side wall having an open portion, and said nest being mounted for limited outward swinging movement, whereby increased ventilation of the nest can be obtained without substantially increasing the intensity of the light within the nest by maintaining said nest in said outwardly swung position.

With these and other objects in view the invention consists of the improved hen's nest, and all of its parts and combinations; as set forth in the claims, and all equivalents thereof.

Referring to the drawing accompanying and forming a part of this specification, wherein is shown one complete embodiment of the preferred form of the invention, and wherein the same reference characters indicate the same parts in all of the views:

Fig. 1 is a front perspective view of the improved nest showing the cover open and the roost in normal position;

Fig. 2 is a view similar to Fig. 1 showing the cover closed and holding the roost in entrance blocking position;

Fig. 3 is an enlarged vertical sectional view taken along the line 3—3 of Fig. 2, but showing the roost in normal position;

Fig. 4 is a sectional view taken along the line 4—4 of Fig. 2; and

Fig. 5 is an enlarged detail sectional view of a portion of the nest floor showing the indentations and the ventilating openings therein.

Referring more particularly to the drawing the numeral 10 indicates the improved nest which is preferably made of sheet metal or other suitable material. The improved nest has a front wall 11, a pair of side walls 12 and 13, and a rear wall 14. The side walls and the front wall 11 may be made with suitable stiffening flanges as shown. The improved nest has a cover which slopes downwardly from the rear toward the front and which has a fixed portion 15 and a hinged portion 16, the latter being formed with a downwardly projecting marginal flange 17. The hinged cover 16 rests on the upper edges of the end walls 12 and 13, and projects forwardly beyond the front wall 11 as shown in Figs. 3 and 4. The front wall does not extend to the upper edges of the end walls 12 and 13, but terminates short thereof leaving a ventilating space 18 between the upper edges of the front wall 11 and the cover 16. The rear wall 14 extends only part way between the bottom of the nest and the cover member 15, leaving an open ventilating space 19 across back of the nest.

A pair of spaced L-shaped partitions 20 and 21 extend between the front wall 11 and the rear wall 14, the partitions preferably having a height adjacent the front wall substantially equal to that of said front wall 11, and having a lesser height adjacent the rear wall 14. Extending rearwardly from the upper edge of the front wall 11 and supported on the upper edges of the partition 20 and 21 is a plate or sheet member 22.

The improved nest, between the partition 21 and the end wall 13, and between the partition 20 and the end wall 12, is preferably provided with a sheet metal floor 23 (see Figs. 4 and 5) which floor is formed with a plurality of upwardly projecting offsets 24. At the apex of each of the offsets 24 the floor 23 is formed with an aperture 25 extending therethrough. The construction of the floor 23 permits ventilating and cooling air to enter the nest through the apertures 25 while preventing the straw or shavings, used as the litter 26, from falling downwardly therethrough.

Between the partitions 20 and 21, the nest 10 is provided with a floor 27 of wire grating. The front wall 11 of the nest 10 is formed with a circular entranceway 28 between said partitions, the lower margin of which is substantially flush with grating 27. Pivotally connected to the front wall 11 of the nest, near its lower edge, as by brackets 29, is a rectangular roost 30. The roost 30 may be made as shown, with suitable means such as projecting members 31 for preventing the roost from swinging downwardly below a horizontal position. The roost 30 has a width approximately equal to the height of the front wall 11, and when it is swung upwardly to the position shown in Fig. 2 and in the dot and dash lines of Fig. 3, it blocks the entranceway 28, thereby preventing any passage of hens therethrough. When the roost 30 is in entrance blocking position, it can be held in this position by the flange 17 of the cover 16, and no other means is necessary for this purpose.

Connected to the upper edge of the top member 15 and to the upper end of the rear edge of the end wall 12 is a bracket 32. Similarly connected to the opposite end of the cover 15 and to the end wall 13 is a bracket 33. The improved nest is preferably mounted on a wall, such as the wall 34, by suspension thereon from the brackets 32 and 33. The construction of the brackets 32 and 33 is such that a limited outward swinging movement of the lower portions of the nest is possible. By inserting a block 35 between the wall 34 and the lower edge of the rear wall 14 of the nest as shown in Fig. 4, increased ventilation of the interior of the nest is made possible by reason of the increased space between nest and the wall 34. It will be noted that this increased ventilation is provided without materially increasing the amount of light which enters the interior of the nest through the space 19.

Referring to Figs. 1 and 3, it will be noted that the partitions 20 and 21, the plate 22 and the grating 27 provide a tunnel inwardly adjacent the opening 28 through which the hens must pass to reach the interior of the nest. This tunnel excludes light from the interior of the nest while permitting access thereto by the hens.

Hens have a habit of roosting in the opening of a nest. Conventional open nests have many openings and employ board roosts in front thereof. Much manure is deposited on the board roosts and in the conventional nest openings with the result that any fresh eggs in the nests are quickly soiled by having this manure tracked into the nest on the hens' feet. In the improved nest there is only one opening, and only one hen can roost there at a time. This roosting, however, has no detrimental result, because the wire grating 27 permits manure and any other refuse to drop therethrough. Similarly, the wire grating roost 30 does not become covered with manure as does a conventional board roost, since it also permits any manure or other refuse to drop through. If the hen should have dirty feet as it alights on the roost 30 en route to the interior of the nest, this dirt will drop off as the hen walks over the roost 30 and the grating 27, and its feet will be clean when it enters the interior of the nest.

When using conventional open nests, hens are encouraged to brood by reason of the fact that access to the nest may be had at any time. With the improved nest, access to the nest can be prevented, during the hours in which the hens do not ordinarily lay, by swinging the roost up and locking it in entrance blocking position as shown in Fig. 2.

The improved nest has a darkened and well ventilated interior which is not only conducive to simultaneous peaceful nesting of a plurality of hens therein, but it also prevents loss of hens due to heat prostration during hot weather. In addition, the improved ventilation provided in the nest 10 causes the eggs to be cooled soon after they are laid, thereby greatly increasing their keeping quality, and preventing the loss of flavor and food value thereof which would otherwise occur if the eggs were allowed to remain warm.

Various changes and modifications may be made without departing from the spirit of the invention; and all of such changes are contemplated as may come within the scope of the claims.

What I claim is:

1. In a hen's nest, a substantially flat floor on which is disposed nest litter, said floor being formed with a plurality of upstanding offsets, and said floor being also formed with a ventilating aperture extending therethrough at the apex of each of said offsets.

2. In a closed type of hen's nest having a chamber substantially closed to the direct entry of light and having means for admitting ventilating air to said chamber, a substantially flat floor for said chamber which floor is adapted to have nest litter disposed thereon, a plurality of upstanding offsets formed on said floor, there being ventilating apertures formed in and extending through said floor and communicating with the upper portions of said offsets to provide for circulation of air through said nest with substantial exclusion of light and without loss of litter.

3. In a closed type of hen's nest having a chamber substantially closed to the direct entry of light and having means for admitting ventilating air to said chamber, a substantially flat floor for said chamber which floor is adapted to have nest litter disposed thereon, a plurality of upstanding offsets formed on said floor, said offsets having sloping sidewalls and having upper surfaces, there being ventilating apertures formed in and extending through said floor and communicating with the upper surfaces of said offsets to provide for circulation of air through said nest with substantial exclusion of light without loss of litter.

ELMER C. KARSTEDT.

REFERENCES CITED

The following references are of record in the file of this patent:

UNITED STATES PATENTS

| Number | Name | Date |
|---|---|---|
| 841,995 | Mier et al. | Jan. 22, 1907 |
| 896,258 | Welch | Aug. 18, 1908 |
| 1,149,340 | Caldwell | Aug. 10, 1915 |
| 1,257,796 | Brooks | Feb. 26, 1918 |
| 1,306,339 | Kass | June 10, 1919 |
| 1,519,518 | Thorp et al. | Dec. 16, 1924 |
| 1,578,692 | Thrasher | Mar. 30, 1926 |
| 1,610,220 | Olson | Dec. 7, 1926 |
| 1,646,334 | Wollenhaupt | Oct. 18, 1927 |
| 1,926,133 | Anderson | Sept. 12, 1933 |
| 2,100,192 | Leindorf | Nov. 23, 1937 |